(12) United States Patent
Owens et al.

(10) Patent No.: US 7,739,674 B2
(45) Date of Patent: Jun. 15, 2010

(54) METHOD AND APPARATUS FOR SELECTIVELY OPTIMIZING INTERPRETED LANGUAGE CODE

(75) Inventors: Howard Dewey Owens, Austin, TX (US); Viatcheslav Alexeyevich Kirillin, St. Petersburg (RU); Mikhail Andreevich Kutuzov, St. Petersburg (RU); Dmitry Sergeevich Preobrazhensky, St. Petersburg (RU)

(73) Assignee: Freescale Semiconductor, Inc., Austin, TX (US)

( * ) Notice: Subject to any disclaimer, the term of this patent is extended or adjusted under 35 U.S.C. 154(b) by 1142 days.

(21) Appl. No.: 10/879,991

(22) Filed: Jun. 29, 2004

(65) Prior Publication Data

US 2004/0243989 A1 Dec. 2, 2004

Related U.S. Application Data

(63) Continuation of application No. PCT/RU02/00469, filed on Oct. 29, 2002.

(51) Int. Cl.
 *G06F 9/45* (2006.01)
(52) U.S. Cl. .................... 717/148; 717/147; 717/152
(58) Field of Classification Search ................ 717/147, 717/148, 152
 See application file for complete search history.

(56) References Cited

U.S. PATENT DOCUMENTS

| 5,623,684 A | 4/1997 | El-Ghoroury et al. | |
| 5,875,336 A * | 2/1999 | Dickol et al. ................ | 717/143 |
| 6,327,702 B1 * | 12/2001 | Sauntry et al. .............. | 717/118 |
| 6,332,216 B1 * | 12/2001 | Manjunath .................. | 717/141 |

(Continued)

FOREIGN PATENT DOCUMENTS

EP 1037145 A2 9/2000

(Continued)

OTHER PUBLICATIONS

Aho, Sethi, and Ullman, "Compilers: Principles, Techniques, and Tools", 1986, Addison-Wesley, ISBN 0-201-10088-6, pp. 528-534.*

(Continued)

*Primary Examiner*—James Rutten
(74) *Attorney, Agent, or Firm*—Susan C. Hill; Joanna G. Chiu; Ranjeev Singh (57) ABSTRACT

In one embodiment of the present invention an interpreted language, such as, for example, Java, is selectively optimized by partitioning the interpreted language code (98) into a plurality of blocks (80-83) based on the complexity of each of the interpreted language instructions. In one embodiment of the present invention, each of the plurality of blocks is identified as either a block to be compiled into native code (80-82) if the block is simple, or a block to be interpreted (83) if the block is complex. The compiled and interpreted blocks are appended to form in-line mixed code (99) that contains both native code (90-92) and interpreted language code (93). This mixed code is formed before run-time, so that no further compilation is required at run-time. A processing unit (102) may be used to execute the native code directly without the use of a Java VM (10), while also executing, in-line, the interpreted language code (93) which requires use of the Java VM (10) to interpret the Java bytecodes.

19 Claims, 5 Drawing Sheets

U.S. PATENT DOCUMENTS

| | | | |
|---|---|---|---|
| 6,408,433 B1 | 6/2002 | Click, Jr. | |
| 6,412,107 B1 | 6/2002 | Cyran | |
| 6,412,109 B1 | 6/2002 | Ghosh | |
| 6,484,188 B1* | 11/2002 | Kwong et al. | 707/206 |
| 6,851,109 B1* | 2/2005 | Alexander et al. | 717/148 |
| 6,910,206 B1* | 6/2005 | Nevill | 717/153 |
| 6,973,646 B1* | 12/2005 | Bordawekar et al. | 717/146 |
| 2002/0108103 A1* | 8/2002 | Nevill | 717/139 |
| 2003/0093778 A1* | 5/2003 | Bak et al. | 717/140 |
| 2003/0093779 A1* | 5/2003 | Bak | 717/148 |
| 2004/0024999 A1* | 2/2004 | Chauvel et al. | 712/245 |

FOREIGN PATENT DOCUMENTS

| | | | |
|---|---|---|---|
| WO | 9531778 A1 | 11/1995 | |

OTHER PUBLICATIONS

Aycock, J. 2003. A brief history of just-in-time. ACM Comput. Surv. 35, 2 (Jun. 2003), 97-113. DOI=http://doi.acm.org/10.1145/857076.857077.*

Suganuma et al., "A Dynamic Optimization Framework for a Java Just-In-Time Compiler," ACM 2001, IBM Tokyo Research Laboratory, pp. 180-194.

Whaley, "Partial Method Compilation Using Dynamic Profile Information," ACM 2001, pp. 166-179.

PCT/RU02/00469 International Search Report. WIPO, May 13, 2004.

PCT International Search Report of counterpart application PCT/RU02/00469 issued May 28, 2003, published May 13, 2004 as publication No. WO2004040445.

* cited by examiner

METHOD AND APPARATUS FOR SELECTIVELY OPTIMIZING INTERPRETED LANGUAGE CODE

This U.S. patent application Ser. No. 10/879,991 is a continuation of the PCT Patent Application RU02/00469 filed on Oct. 29, 2002.

FIELD OF THE INVENTION

The present invention relates generally to an interpreted language, and more specifically to a method and apparatus for selectively optimizing an interpreted language.

BACKGROUND OF THE INVENTION

Interpreted languages, such as Java, are high-level languages compiled to an intermediate level that requires an extra level of indirection to execute. For example, an interpreted language, such as Java, is independent of the hardware platform. It is generally more difficult for software code written in an interpreted language to breach the security of the host system which is executing the intermediate level code.

Java is an object-oriented, multi-threaded programming language that compiles to a compact intermediate form known as bytecodes. Java is a common interpreted language which is used to transfer applications over the internet. Traditional Java technology generally cannot be efficiently applied for embedded software development. Java bytecode may be either directly executed by a Java bytecode interpreter or accelerated by a Just-In-Time (JIT) complier. Both methods have their advantages and drawbacks. Java bytecode interpreters require no or little memory for execution, but the speed of interpretation is relatively slow. Conventional JIT compilers are too big for embedded applications and use a lot of memory, although JIT compilers provide significant acceleration by compiling Java bytecode into a native language at run-time. Some compilers minimize the resources used by compiling only performance-crucial fragments of applications. However, these compiled fragments may contain relatively complex instructions (e.g. method invocation instructions), which results in huge generated code and additional overhead for compilation.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

In one embodiment of the present invention, an interpreted language (e.g. Java) is selectively optimized by partitioning the interpreted language code into a plurality of blocks based on the complexity of each of the interpreted language instructions. In one embodiment of the present invention, each of the plurality of blocks is identified as either a block to be compiled into native code if the block is simple, or a block to be interpreted (e.g. left as Java bytecodes) if the block is complex. In one embodiment of the present invention, a simple instruction is a Java bytecode that does not have any dependencies on Java VM 10 services (e.g. memory allocation, garbage collection, etc.). The compiled and non-compiled (i.e. interpreted) blocks are appended to form in-line mixed code (e.g. 99 in FIG. 6) that contains both native code (e.g. 90-92) and interpreted language code (e.g. 93). It is this in-line mixed code that is executed at run time. Thus, no JIT compiler is required at run time. A processing unit (e.g. 102 in FIG. 7) may be used to execute the native code directly without the use of a Java VM 10, while also executing, in-line, the interpreted language code which requires use of the Java VM 10 to perform the interpretation of the Java bytecodes. Consequently, for simple blocks, the extra level of indirection added by the Java VM 10 can be avoided, thus saving time and/or memory for systems (e.g. 100 in FIG. 7) which are executing an interpreted language. This time/memory savings may be especially important for portable or handheld devices which can download files from the internet, and thus can execute an interpreted language such as Java.

As used herein, the term "bus" is used to refer to a plurality of signals or conductors which may be used to transfer one or more various types of information, such as data, addresses, control, or status.

Figure 1:
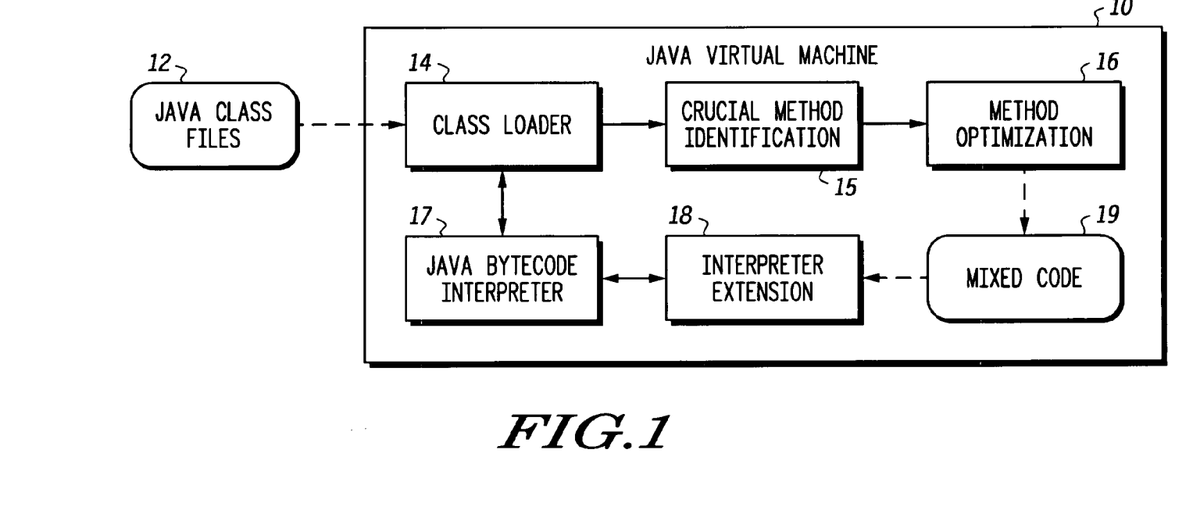
FIG. 1 illustrates one embodiment of a Java virtual machine 10 in accordance with one embodiment of the present invention.

FIG. 1 illustrates one embodiment of a Java virtual machine 10 in accordance with one embodiment of the present invention. In one embodiment, the present invention utilizes a Java virtual machine (VM) 10 which receives Java class files 12 from a source external to the Java VM 10. The Java VM 10 includes a class loader 14 which loads one or more Java classes from Java class files 12. The class loader 14 provides Java class files to the portion of the Java VM 10 that is responsible for crucial method identification 15. The crucial method identification 15 process identifies performance-crucial functions (e.g. Java methods) of the loaded Java class files using a profiler or externally-supplied information, e.g. special Java method attributes. Any appropriate process for performing the crucial method identification 15 process may be used (e.g. profiling). For some applications, 80% of the application's execution time is spent executing 20% of the application's code. Thus acceleration of this 20% of the application's code may very significantly improve performance. The performance-crucial functions are passed from step 15 to step 16 where the Java methods are optimized. The method optimization step 16 is described in more detail in FIG. 2.

The output of method optimization step 16 is mixed code 19 which may include both interpreted language instructions (e.g. bytecodes for Java) and native instructions. In one embodiment of the present invention, the interpreter extension 18 extends the original Java bytecode interpreter 17 by recognizing and handling a special instruction (i.e. Java bytecode) called "run_native"which transfers control from the interpreted language instructions to the native instructions of the mixed code. Control of the host processor (e.g. 102 of FIG. 7) is transferred from executing the Java virtual machine 10 to executing a subsequent native instruction in the mixed code. In one embodiment, the interpreter extension 18 implements an efficient binary interface with the compiled native code; for example, the interpreter extension 18 may cache the most significant variables of the Java bytecode interpreter 17 in registers. When the interpreter extension 18 encounters a run_native instruction, it transfers control to the following compiled native code. Other Java bytecode instructions are interpreted using the Java bytecode interpreter 17. The interpreter extension 18 may be implemented in any manner.

Figure 7:
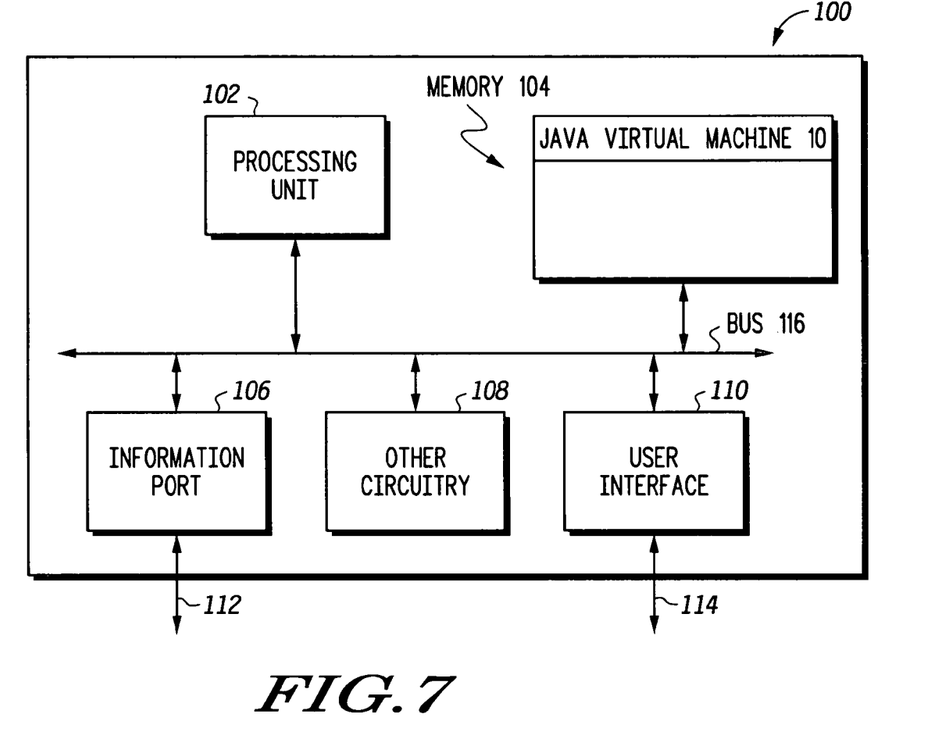
FIG. 7 illustrates a data processing system 100 in accordance with one embodiment of the present invention.

In one embodiment of the present invention, to minimize Java operand stack access in the native code, stack values used by the native code are cached in a special register file (e.g. in processing unit 102 or memory 104 of FIG. 7). The register file is a set of registers which mimic top Java operand stack values. In one embodiment of the present invention, in the beginning of the compiled code, all Java stack values used by the compiled code are transferred into the register file. At the end of the compiled code, all new values are copied back into the Java operand stack. The size of the compiled code is limited so that all used stack values are kept in the register file. Fortunately, due to the nature of Java applications, most compiled fragments use five or less Java stack elements. Moreover, most compiled fragments do not transfer any data to their neighbors via the Java operand stack so the generated binary code is usually very compact.

Figure 2:
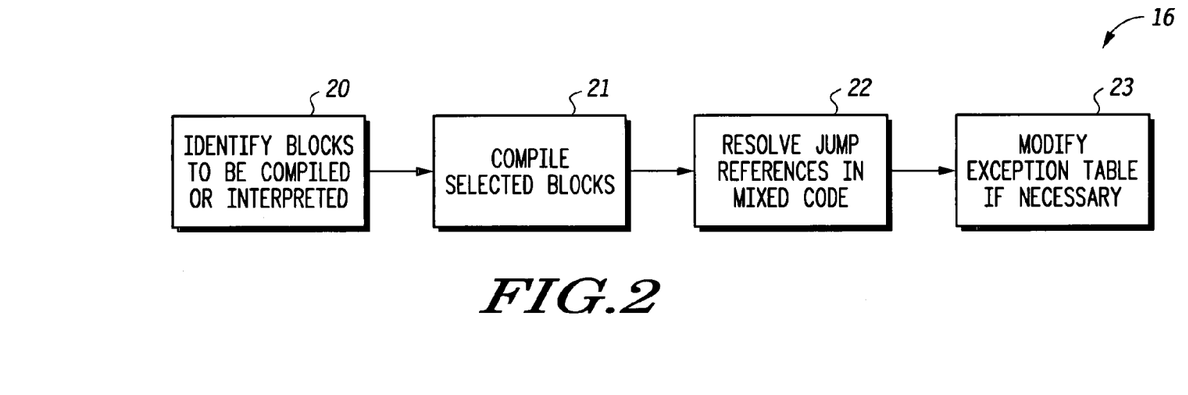
FIG. 2 illustrates one embodiment of the Java method optimization 16 of FIG. 1 in accordance with one embodiment of the present invention.

FIG. 2 illustrates one embodiment of the Java method optimization of FIG. 1 in accordance with one embodiment of the present invention. In step 20, the blocks to be compiled are identified and the blocks to be interpreted are identified. Then in step 21, the blocks selected to be compiled are actually compiled. Step 22 resolves any jump references in the mixed code, and step 23 modifies the exception table as necessary.

The present invention thus compiles only the most profitable blocks of the Java method's bytecodes which may be significantly accelerated without much memory overhead; other blocks are left untouched. The set of compiled instructions depends on the architecture of the Java bytecode interpreter 17 and the target processor (e.g. processing unit 102 of FIG. 7). In one embodiment of the present invention, the blocks are selected so that each block has just one entry point and one exit point. In some embodiments, native code for each compiled Java instruction will not exceed 10-15 instructions of the target processor and will not include subroutine calls. Alternate embodiments of the present invention may set other limits on determining which instructions will be compiled. Note that compilation of complex instructions does not necessarily improve performance, but takes up additional resources and complicates optimization. The compiled blocks of Java bytecode are replaced by the generated binary code prefixed with a special bytecode instruction run_native.

Figure 6:
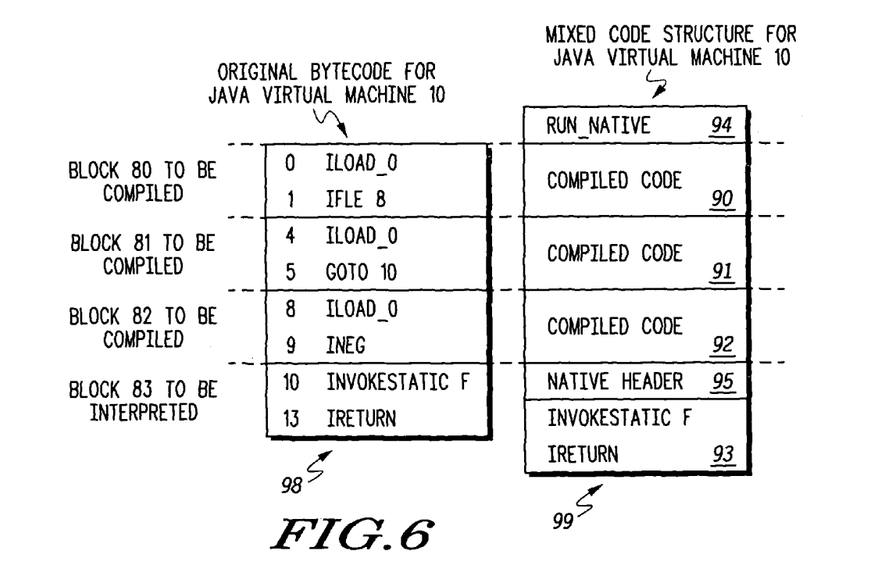
FIG. 6 illustrates one embodiment of the code 98 (i.e. original bytecode for Java VM 10) and a translation which produced code 99 (i.e. mixed code structure for Java VM 10)

"Run—native" is a predetermined interpreted language instruction which indicates to the interpreter extension 18 (see FIG. 1) that the following code is native code. The resultant mixed code 19 from method optimization 16 consists of blocks of native code and Java bytecode instructions which cannot be well accelerated. The mixed code structure of a Java method having mixed code is illustrated in FIG. 6. Alternate embodiments of the present invention may use other approaches to indicate to the interpreter extension that the following or subsequent in-line code is native code.

Figure 3:
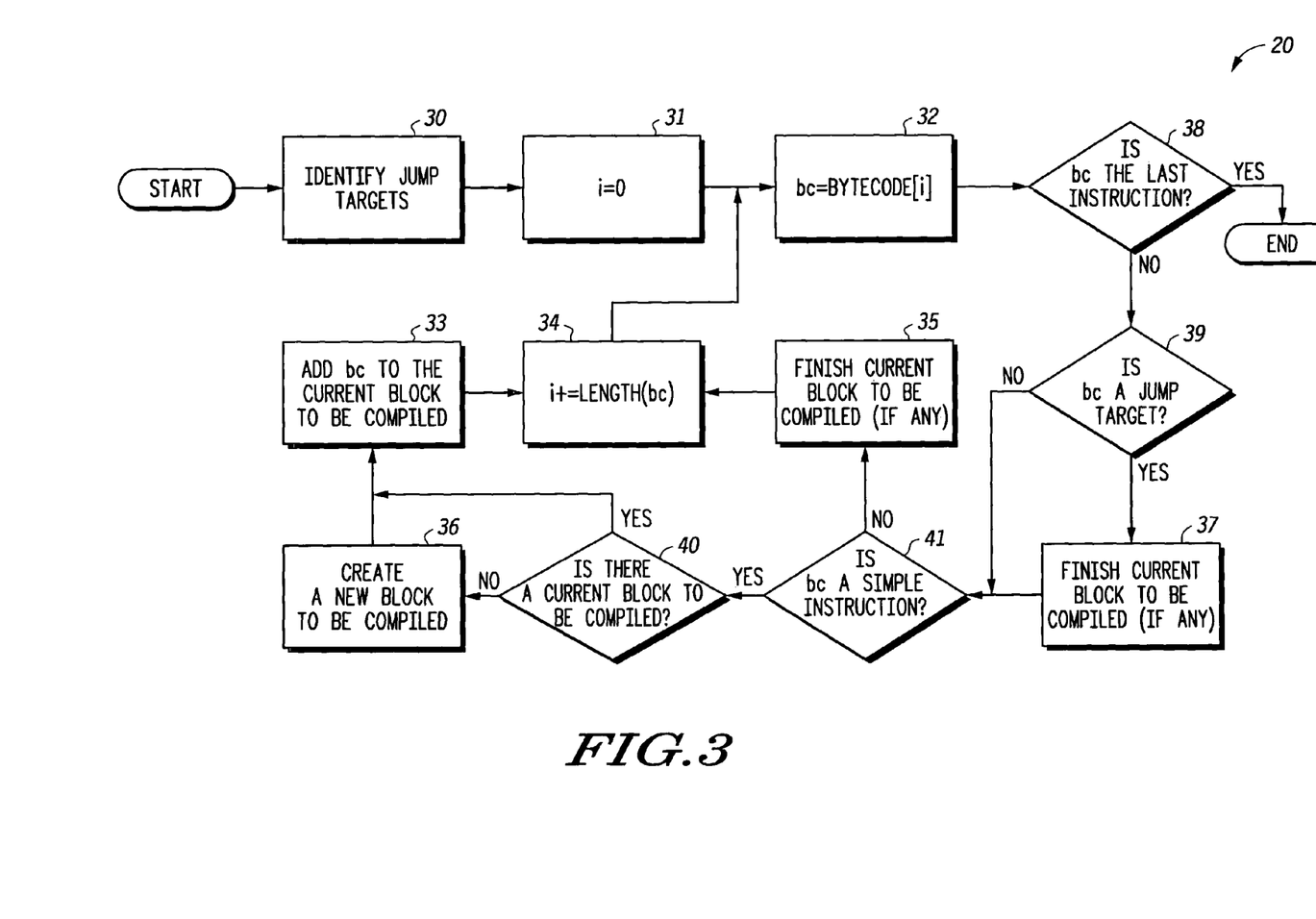
FIG. 3 illustrates one embodiment of step 20 of FIG. 2 in which blocks to be compiled or interpreted are identified in accordance with one embodiment of the present invention.

FIG. 3 illustrates one embodiment of step 20 of FIG. 2 in which blocks to be compiled or interpreted are identified in accordance with one embodiment of the present invention. In step 30, jump targets are identified. The flow then continues to step 31 where the variable "i" is set to zero. The variable "i" indicates which bytecode is currently being processed. In step 32, the current bytecode "bc" is set equal to bytecode(i). Note that alternate embodiments of the present invention may perform step 32 as the first step in the "NO" path after decision diamond 38 with step 31 linked directly with step 32 and step 34 being the input for decision diamond 38. At decision diamond 38 the question is asked "is the current bytecode "bc" the last instruction?". If "bc" is the last instruction, then the end has been reached and the process continues with step 21 in FIG. 2. If "bc" is not the last instruction, then the process continues to decision diamond 39 where the question is asked "is bc a jump target?". If bc is a jump target, the process continues to step 37 where the current block to be compiled (if any) is finished, and the process continues to decision diamond 41. If bc is not a jump target, the process continues to decision diamond 41 where the question is asked "is bc a simple instruction?"

In one embodiment of the present invention, a simple instruction is a Java bytecode that does not have any dependencies on Java VM 10 services (e.g. memory allocation, garbage collection, etc.). Alternate embodiments of the present invention may use any desired criteria to determine which interpreted language instructions are "simple". If the current bytecode "bc" is not a simple instruction, then the process continues to step 35 where the current block to be compiled, if there is any, is finished. From step 35, the process continues to step 34 where the process determines the length of the current bytecode "bc" so that the flow can move to the beginning of the next bytecode. From step 34, the process continues to step 32 where the next bytecode becomes the current bytecode. If the current bytecode is a simple instruction, then the process continues to decision diamond 40 where the question is asked "is there a current block to be compiled?". If there is a current block to be compiled, the process continues to step 33 where the current bytecode is added to the current block to be compiled. If there is not a current block to be compiled, the process continues to step 36 where a new block to be compiled is created. From step 36, the process continues to step 33 where the next bytecode becomes the current bytecode (e.g. by adding "bc" to the current block to be compiled). The process then continues to step 34, then step 32, then decision diamond 38 as described above.

Figure 4:
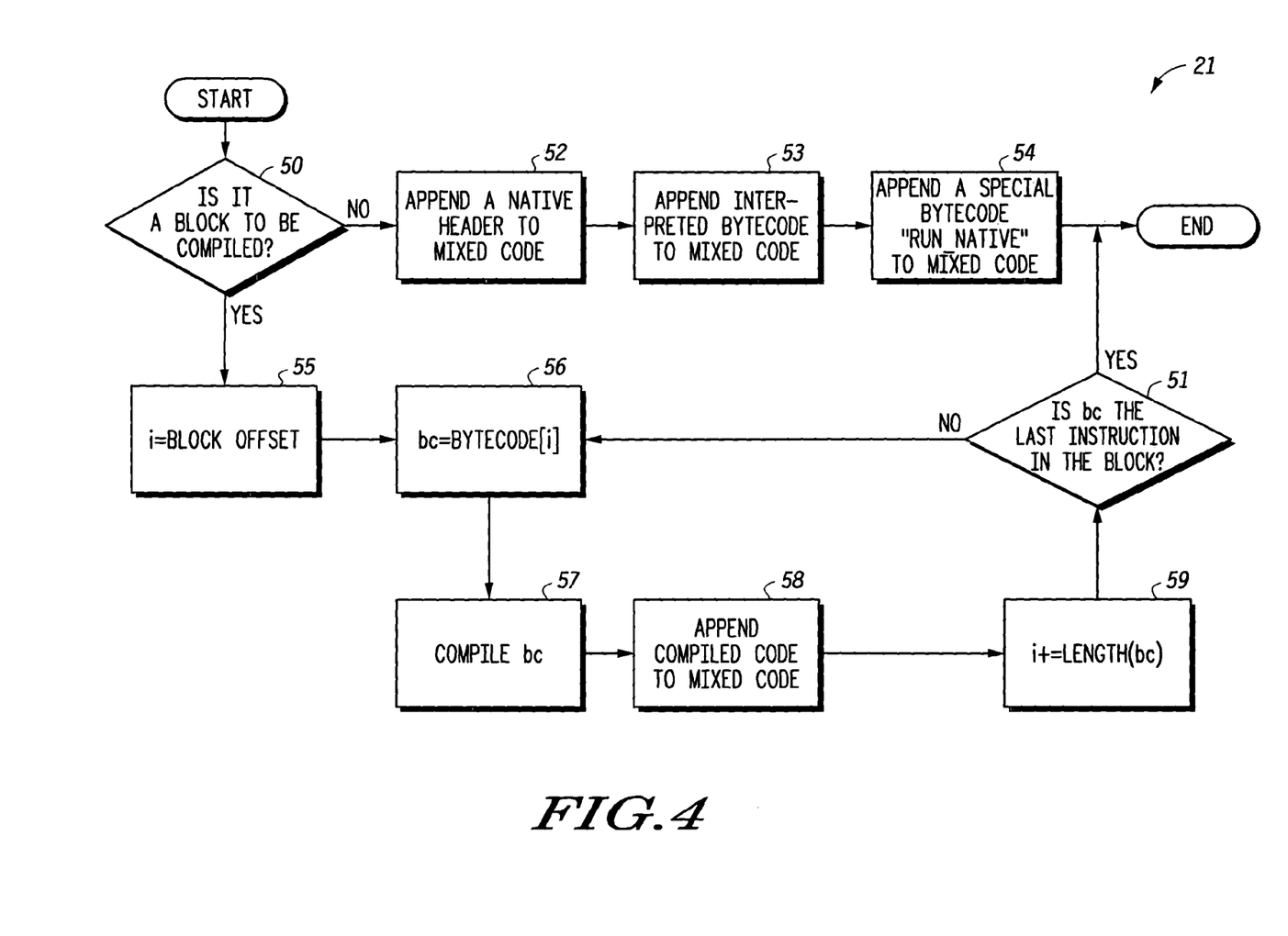
FIG. 4 illustrates one embodiment of step 21 of FIG. 2 in which selected blocks identified in step 20 are now compiled in accordance with one embodiment of the present invention.

FIG. 4 illustrates one embodiment of step 21 of FIG. 2 in which selected blocks identified in step 20 are now compiled in accordance with one embodiment of the present invention. The process starts at decision diamond 50 where the question is asked "is the current block a block to be compiled?".

If the current block is a block to be compiled, i.e. is a block to be compiled as native code, the process continues at step 55 where the variable "i" is set equal to the block offset. The process continues to step 56 where "bc" is set equal to the current bytecode "bytecode(i)". The process continues to step 57 where the current bytecode "bc" is compiled. The compilation step 57 results in compiled code in the native language of processing unit 102 (see FIG. 7). The process continues to step 58 where the compiled code in the native language is appended to the mixed code (see right-hand column in FIG. 6). The process continues to step 59 where the process determines the length of the current bytecode so that the flow can move to the beginning of the next bytecode. The process continues to decision diamond 51 where the question is asked "is bc the last instruction in the block?". If the current bytecode is the last one in the block, the process continues to step 22 in FIG. 2. If the current bytecode is not the last one in the block, the process continues to step 56 where the next bytecode in the block is made the current bytecode, and the steps 57-59 are repeated.

If the current block is not a block to be compiled, i.e. is a block to be left as Java bytecodes, then the flow continues from decision diamond 50 to step 52 where a native header (e.g. native header 95 in FIG. 6) is appended to the mixed code. The native header 95 can be used to return control from the native code back to the Java bytecode interpreter 17 (see FIG. 1). The mixed code may include both Java bytecodes and native instructions. From step 52, the process continues to step 53 where the interpreted bytecode is appended to the mixed code. In one embodiment of the present invention, no compilation of the interpreted bytecodes is performed. The interpreted bytecodes remain unchanged and are merely appended as they are to the in-line mixed code 99 of FIG. 6. From step 53, the process continues to step 54 where a special bytecode called "run_native" is appended to the mixed code (see run_native 94 appended to mixed code 99 of FIG. 6) in preparation of the next block to be compiled.

The special bytecode "run_native" is used to transfer control from the interpreted language instructions to the native instruction of the mixed code. In one embodiment, control of the host processor (e.g. 102 of FIG. 7) is transferred from executing the Java virtual machine 10 to executing a subsequent native instruction in the mixed code.

In alternate embodiments of the present invention, steps 56-59 and decision diamond 51, which process one bytecode at a time, may be replaced by a parallel process that considers a plurality of bytecodes at a time in order to perform further optimization.

Figure 5:
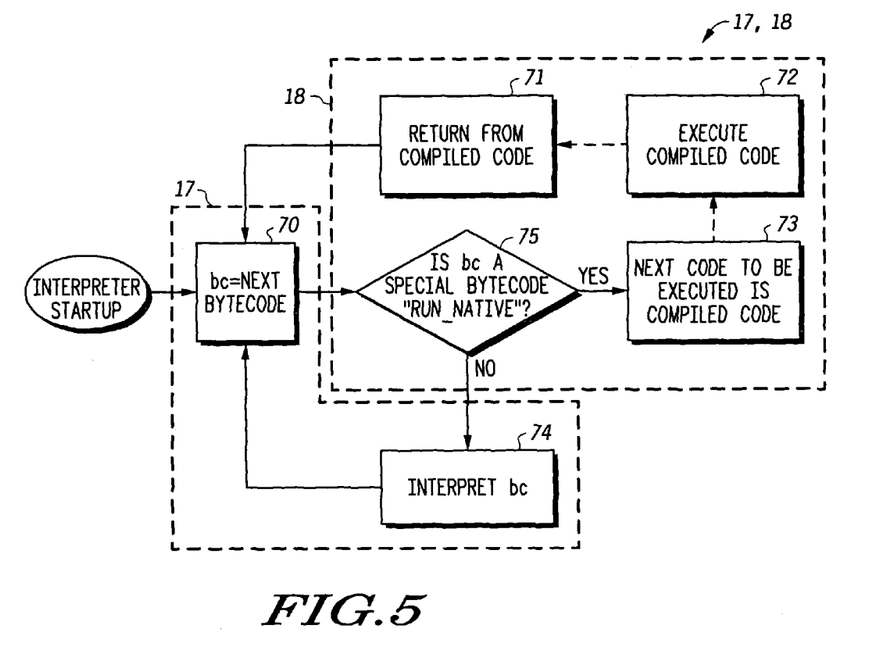
FIG. 5 illustrates one embodiment of Java bytecode interpreter 17 and interpreter extension 18 of FIG. 1 in accordance with one embodiment of the present invention.

FIG. 5 illustrates one embodiment of Java bytecode interpreter 17 and interpreter extension 18 of FIG. 1 in accordance with one embodiment of the present invention. At startup, Java bytecode interpreter 17 sets the current bytecode "bc" equal to the next bytecode in step 70. The process continues to decision diamond 75 in interpreter extension 18 where the question is asked "is bc a special bytecode "run_native""?. If the current bytecode is not the special bytecode "run_native", the process continues to step 74 where the Java bytecode interpreter 17 interprets the current bytecode. The process then continues back to step 70 where the next bytecode is selected. Returning to decision diamond 75, if the current bytecode is the special bytecode "run_native", the process continues to step 73 where the next code to be executed is compiled code in native language. The process continues to step 72 where the compiled code in native language is executed. The process continues to step 71 where a return from the compiled code is performed. In one embodiment of the present invention, the return from the compiled code is implemented by way of a native header 95 (see FIG. 6). From step 71, the process continues to step 70 where the next bytecode is selected. If the next bytecode is the last bytecode, and thus is of the type "return" at the highest level, then the processing unit 102 of FIG. 7 stops executing the Java VM 10.

Note that the software used in the present invention is not limited to the embodiments described in the flow diagrams. For example, the ordering of the steps and decision points described in the flow diagrams may be varied for different embodiments of the present invention. In addition, alternate embodiments of the present invention may use different steps and/or decision diamonds than those illustrated in the flow diagrams.

FIG. 6 illustrates one embodiment of the code 98 (i.e. original bytecode for Java VM 10) and a translation which produced code 99 (i.e. mixed code structure for Java VM 10). In one embodiment of the present invention, code 99 includes compiled code 90, 91, and 92 in-line with appended code 93. In one embodiment of the present invention, appended code 93 is Java bytecode. Run_native is a special bytecode that is used as an instruction for the interpreter extension 18 (see FIG. 1) to indicate that the following in-line code is native code to be executed directly by processing unit 102 (see FIG. 7) without use of the Java VM 10. Native header 95 is used by processor 102 to return control back to the Java bytecode interpreter 17 within the Java VM 10. Note that this mixed code 99 is formed before run-time, so that, unlike JIT compilers, no further compilation is required at run-time.

In one embodiment, code 98 is the original bytecode for the Java VM 10. The specific instruction used in FIG. 6 are for illustrative purposes only. Other instructions could have been used. Note that the interpreted language instructions (e.g. block 93) are still interpreted by the Java VM 10 running on host processor 102, unlike the compiled code 90-92 which is native code that is executed directly by processor 102 without use of the Java VM 10.

Referring to code 98, Java bytecode "ILOAD_0" located at offset 0 and Java bytecode "IFLE_8" located at offset 1 together form a block 80 that is determined to be "simple"(see decision diamond 41 in FIG. 3) and thus is to be compiled. Java bytecode "ILOAD_0" located at offset 4 and Java bytecode "GOTO 10" located at offset 5 together form a block 81 that is determined to be "simple"(see decision diamond 41 in FIG. 3) and thus is to be compiled. Java bytecode "ILOAD_0" located at offset 8 and Java bytecode "INEG" located at offset 9 together form a block 82 that is determined to be "simple"(see decision diamond 41 in FIG. 3) and thus is to be compiled. Block 80 is compiled to create compiled code 90; block 81 is compiled to create compiled code 91; and block 82 is compiled to create compiled code 92. A special bytecode instruction run_native 94 is placed in the in-line code just before the beginning of the blocks of compiled code 80-82. The native header 95 is placed in the in-line code at the end of the native code and just before the beginning of the interpreted code 93. In one embodiment of the present invention, the interpreted code 93 is the same as the block of code 83 that is to be interpreted. In one embodiment, the translation process from code 98 to code 99 merely copies the original Java bytecodes from block 83 to block 93. In one embodiment, mixed code 99 now includes both compiled code in the native language and non-compiled code that is still Java bytecodes. Code 98 and mixed code 99 may be stored in memory 104 (see FIG. 7) or in any other portion of data processing system 100.

FIG. 7 illustrates a data processing system 100 in accordance with one embodiment of the present invention. In one embodiment, data processing system 100 is a portable, handheld device. In one embodiment of the present invention, data processing system is capable of receiving information from the internet via information port 106. Although data processing system 100 has been shown to have the architecture illustrated in FIG. 7, any architecture may be used for data processing system 100.

In one embodiment, data processing system 100 has a processing unit 102, a memory 104, an information port 106, other circuitry 108, and user interface 110 which are bi-directionally coupled to bus 116. In one embodiment of the present invention, memory 104 includes a Java virtual machine 10. In alternate embodiments of the present invention, Java VM 10 may be stored anywhere. Alternate embodiments of the present invention may use other circuitry 108 to implement any desired function. Alternate embodiments of data processing system 100 may not include information port 106, may not include other circuitry 108, and/or may not include user interface 110. User interface 110 may include anything which allows a user to communicate with data processing system 100, such as, for example, a keypad, mouse, a display, a touch screen, or audio I/O.

In the foregoing specification, the invention has been described with reference to specific embodiments. However, one of ordinary skill in the art appreciates that various modifications and changes can be made without departing from the scope of the present invention as set forth in the claims below. For example, although various embodiments of the present invention have been described in the context of Java, the present invention is applicable to any interpreted language, not just Java. Similarly, any architecture for data processing system 100 (see FIG. 7) may be used. Similarly, any software may be used to implement the claimed invention. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises", "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. In a virtual machine executing on a host processor, a method for selectively optimizing interpreted language code, comprising:
   receiving interpreted language code comprising interpreted language instructions;
   partitioning the interpreted language code into a performance-crucial block and a non-performance crucial block; and
   partitioning the interpreted language code of the performance-crucial block into a plurality of blocks based on a complexity of each of the interpreted language instructions,
   wherein the complexity of the interpreted language instructions is related to dependencies on virtual machine services and unrelated to execution frequency of the interpreted language instructions;
   identifying a first block of the plurality of blocks as a block to be compiled based on the first block including one or more simple instructions that are independent of virtual machine services and a second block of the plurality of blocks as a block to be interpreted based on the second block being dependent on virtual machine services;
   creating mixed code, said mixed code comprising native instructions and interpreted language instructions, wherein creating said mixed code comprises:
      compiling the first block before run-time;
      appending the compiled first block to the mixed code, wherein the compiled first block includes a plurality of native instructions that, when executed, do not depend on the virtual machine services; and
      appending the second block to the mixed code, wherein the second block comprises a plurality of interpreted language instructions wherein one or more of the plurality of interpreted language instructions depend on the virtual machine services,
   wherein run-time compilation of the first block is never required when using this method, and
   wherein, in the mixed code, the interpreted language instructions are in-line with the native instructions.

2. The method of claim 1, wherein the interpreted language instructions are Java instructions.

3. The method of claim 1, wherein the native instructions run on the host processor and the interpreted language instructions are interpreted by the virtual machine.

4. The method of claim 1, wherein creating the mixed code further comprises:
   appending, before run-time, a predetermined interpreted language instruction to the mixed code, wherein the predetermined interpreted language instruction transfers control from the interpreted language instructions to the native instructions of the mixed code.

5. The method of claim 1, wherein complex interpreted language instructions comprise a method invocation instruction.

6. The method of claim 1, wherein for each of the interpreted language instructions in the interpreted language code, partitioning further comprises:
   determining if the interpreted language instruction is a simple instruction;
   if the interpreted language instruction is a simple instruction, including the interpreted language instruction into one of the plurality of blocks identified as a block to be compiled; and
   if the interpreted language instruction is not a simple instruction, including the interpreted language instruction into one of the plurality of blocks identified as a block to be interpreted.

7. The method of claim 6, wherein for each of the interpreted language instructions in the interpreted language code, partitioning further comprises:
   determining if the interpreted language instruction is a jump target; and
   if the interpreted language instruction is a jump target, finishing a current block within the plurality of blocks.

8. The method of claim 1, wherein when a first one of the interpreted language instructions is dependent on one or more virtual machine services, the first one of the interpreted language instructions is considered to be a complex instruction.

9. A data processing system for creating mixed in-line code, said mixed in-line code comprising native instructions and interpreted language instructions, said data processing system comprising:
   a processing unit for executing native instructions;
   a memory coupled to the processing unit and having a virtual machine, wherein said virtual machine is executed by the processing unit and comprises:
      a first set of instructions for receiving interpreted language code comprising interpreted language instructions;
      a second set of instructions for partitioning, before run-time, the interpreted language code into a plurality of blocks based on a complexity of each of the interpreted language instructions, each of the plurality of blocks identified as one of a block to be compiled before run-time or a block to be interpreted at run-time, wherein the complexity of the interpreted language instructions is related to dependencies on virtual machine services and unrelated to execution frequency of the interpreted language instructions;

a third set of instructions for compiling, before run-time, each of the plurality of blocks identified as a block to be compiled, wherein a first of the blocks to be compiled is identified and compiled based on the first block including one or more instructions that are independent of virtual machine services;

a fourth set of instructions for appending, before run-time, the compiled blocks to the mixed in-line code, wherein the compiled blocks each comprises a plurality of native instructions; and a fifth set of instructions for appending, before run-time, each of the plurality of blocks identified as a block to be interpreted to the mixed in-line code, wherein each of the plurality of blocks identified as a block to be interpreted comprises a plurality of interpreted language instructions.

10. The data processing system of claim 9, wherein the virtual machine further comprises:

a sixth set of instructions for receiving an interpreted language instruction from the mixed in-line code;

a seventh set of instructions for determining if the received interpreted language instruction from the mixed in-line code is a predetermined interpreted language instruction;

an eighth set of instructions for transferring control to a native instruction in the mixed in-line code if the received interpreted language instruction from the mixed in-line code is the predetermined interpreted language instruction; and a ninth set of instructions for interpreting the received interpreted language instruction from the mixed in-line code if the received interpreted language instruction from the mixed in-line code is not the predetermined interpreted language instruction.

11. The data processing system of claim 9, wherein the second set of instructions further comprises:

a sixth set of instructions for determining if an interpreted language instruction is a simple instruction, a seventh set of instructions for including the interpreted language instruction into one of the plurality of blocks identified as a block to be compiled if the interpreted language instruction is a simple instruction; and an eighth set of instructions for including the interpreted language instruction into one of the plurality of blocks identified as a block to be interpreted if the interpreted language instruction is not a simple instruction.

12. A hand held device comprising the data processing system of claim 9.

13. A data processing system for creating mixed in-line code, said mixed in-line code comprising native instructions and interpreted language instructions, said data processing system comprising:

means for receiving interpreted language code comprising interpreted language instructions;

means for partitioning, before run-time, the interpreted language code into a plurality of blocks based on a complexity of each of the interpreted language instructions, each of the plurality of blocks identified as one of a block to be compiled or a block to be interpreted, wherein the complexity of the interpreted language instructions is related to dependencies on virtual machine services and unrelated to execution frequency of the interpreted language instructions;

means for identifying a first of the plurality of blocks identified as a block to be compiled based on the first block being independent of virtual machine services;

means for compiling, before run-time, each of the plurality of blocks, including the first block, identified as a block to be compiled, wherein the first block is compiled based on the identification of the first block being independent of virtual machine services;

means for appending, before run-time, the compiled blocks to the mixed in-line code, wherein the compiled blocks each comprises a plurality of native instructions; and means for appending, before run-time, each of the plurality of blocks identified as a block to be interpreted to the mixed in-line code, wherein each of the plurality of blocks identified as a block to be interpreted comprises a plurality of interpreted language instructions.

14. The data processing system of claim 13, wherein the data processing system further comprises:

means for receiving an interpreted language instruction from the mixed in-line code;

means for determining if the received interpreted language instruction from the mixed in-line code is a predetermined interpreted language instruction, wherein the predetermined interpreted language instruction indicates that the subsequent in-line code is native code.

15. The data processing system of claim 13, further comprising:

means for determining if an interpreted language instruction is a simple instruction based on identifying whether the interpreted instruction is a simple instruction that is independent of virtual machine services, means for including the interpreted language instruction into one of the plurality of blocks identified as a block to be compiled if the interpreted language instruction is a simple instruction; and means for including the interpreted language instruction into one of the plurality of blocks identified as a block to be interpreted if the interpreted language instruction is not a simple instruction.

16. A hand held device comprising the data processing system of claim 13.

17. A virtual machine stored on a computer readable medium, said virtual machine capable of being executed by a host processor, said virtual machine comprising:

a first set of instructions for receiving interpreted language code comprising interpreted language instructions and for partitioning the interpreted language code into performance-crucial blocks and non-performance crucial blocks;

a second set of instructions for further partitioning the interpreted language code of the performance-crucial blocks into a plurality of blocks based on a complexity of each of the interpreted language instructions, each of the plurality of blocks identified as one of a block to be compiled before run-time or a block to be interpreted at run-time, wherein the complexity of the interpreted language instructions is related to dependencies on virtual machine services and unrelated to execution frequency of the interpreted language instructions;

a third set of instructions for compiling, before run-time, each of the plurality of blocks identified as a block to be compiled, wherein a first of the blocks to be compiled is identified and compiled based on the first block including one or more simple instructions that are independent of virtual machine services;

a fourth set of instructions for appending the compiled blocks to mixed code, wherein the compiled blocks each comprises a plurality of native instructions capable of being executed by the host processor; and a fifth set of instructions for appending each of the plurality of blocks identified as a block to be interpreted to the mixed code, wherein each of the plurality of blocks identified as a block to be interpreted comprises a plurality of interpreted language instructions, wherein, in the mixed code, the interpreted language instructions are in-line with the native instructions, and wherein the plurality of blocks identified as blocks to be compiled are compiled before run-time.

18. The virtual machine of claim 17, wherein the virtual machine further comprises:

a sixth set of instructions for receiving an interpreted language instruction from the mixed code;

a seventh set of instructions for determining if the received interpreted language instruction from the mixed code is a predetermined interpreted language instruction;

an eighth set of instructions for transferring control to a native instruction in the mixed code if the received interpreted language instruction from the mixed code is the predetermined interpreted language instruction; and a ninth set of instructions for interpreting the received interpreted language instruction from the mixed code if the received interpreted language instruction from the mixed code is not the predetermined interpreted language instruction.

19. The virtual machine of claim 17, wherein the second set of instructions further comprises:

a sixth set of instructions for determining if an interpreted language instruction is a simple instruction, a seventh set of instructions for including the interpreted language instruction into one of the plurality of blocks identified as a block to be compiled if the interpreted language instruction is a simple instruction; and an eighth set of instruction for including the interpreted language instruction into one of the plurality of blocks identified as a block to be interpreted if the interpreted language instruction is not a simple instruction.

* * * * *